United States Patent
Namie et al.

(10) Patent No.: US 8,323,135 B2
(45) Date of Patent: Dec. 4, 2012

(54) DOWNWARD ANGLE SETTABLE HYDRAULIC TENSIONER

(75) Inventors: Tsutomu Namie, Osaka (JP); Hiroshi Hashimoto, Osaka (JP); Hiroyuki Miyake, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 503 days.

(21) Appl. No.: 12/006,397

(22) Filed: Jan. 2, 2008

(65) Prior Publication Data

US 2008/0220918 A1 Sep. 11, 2008

(30) Foreign Application Priority Data

Mar. 6, 2007 (JP) .................................. 2007-056236

(51) Int. Cl.
*F16H 7/22* (2006.01)

(52) U.S. Cl. .......................... 474/110; 474/101; 474/109

(58) Field of Classification Search .................. 474/110, 474/101, 109
See application file for complete search history.

(56) References Cited

U.S. PATENT DOCUMENTS

| 4,894,047 | A | * | 1/1990 | Breon et al. | 474/110 |
| 5,087,225 | A | * | 2/1992 | Futami et al. | 474/91 |
| 7,468,012 | B2 | * | 12/2008 | Hayami et al. | 474/110 |
| 2002/0022541 | A1 | * | 2/2002 | Ullein et al. | 474/110 |
| 2002/0098931 | A1 | * | 7/2002 | Kurohata et al. | 474/109 |
| 2002/0142871 | A1 | | 10/2002 | Namie et al. | |
| 2008/0207365 | A1 | * | 8/2008 | Namie et al. | 474/110 |

FOREIGN PATENT DOCUMENTS

| JP | 62-40357 | 3/1987 |
| JP | 2-109046 | 8/1990 |
| JP | 2002-286104 | 10/2002 |

* cited by examiner

*Primary Examiner* — Michael Mansen
*Assistant Examiner* — Robert T Reese
(74) *Attorney, Agent, or Firm* — Howson & Howson LLP

(57) ABSTRACT

The hollow plunger of a hydraulic tensioner for an engine timing chain protrudes from a tensioner housing in an oblique downward direction. An inner sleeve fixed to the housing slidably protrudes into the interior of the plunger, and has a ball check valve at its protruding end. Oil is supplied though the sleeve and the check valve to a high pressure oil chamber formed inside the plunger, and flows outward through a two-part leakage path formed by a gap between the sleeve and the interior of the plunger and a gap between the exterior of the plunger and an interior wall of a plunger-accommodating hole in the housing. Any air that enters the tensioner accumulates in a region surrounding the upper end of the sleeve, rather than in the high oil pressure chamber inside the plunger.

6 Claims, 7 Drawing Sheets

DOWNWARD ANGLE SETTABLE HYDRAULIC TENSIONER

CROSS-REFERENCE TO RELATED APPLICATION

This application claims priority on the basis of Japanese application 2007-056236, filed Mar. 6, 2007. The disclosure of Japanese application 2007-056236 is hereby incorporated by reference.

FIELD OF THE INVENTION

This invention relates to a hydraulic tensioner of the kind used to apply proper tension to a timing belt, a timing chain, or the like, in a vehicle engine. More specifically, the invention relates to a downward angle settable hydraulic tensioner, i.e., a tensioner that can be mounted so that its plunger protrudes in an oblique downward direction.

BACKGROUND OF THE INVENTION

Hydraulic tensioners have been widely used to maintain proper tension, and suppress vibration, in engine timing chains, i.e., the endless chains used to transmit rotation from an engine crankshaft to one or more valve-operating camshafts.

In a typical conventional hydraulic tensioner 500, as shown in 6A, 6B and 7, a plunger 520 fits slidably in a plunger-accommodating hole 511 formed in a housing 510. The plunger has a cylindrical hollow portion 521 with one end open, and accommodates a plunger-biasing spring 550, which urges the plunger 520 in a protruding direction.

A high pressure chamber R is formed by the plunger-accommodating hole 511 and the cylindrical hollow portion 521 of the plunger 520. A check valve unit 540 permits flow of oil into the high pressure oil chamber, but blocks reverse flow of oil. The check valve unit comprises a ball seat 541, a check ball 542 facing the ball seat 541, a ball-biasing spring 543, which urges the check ball 542 into engagement with the ball seat 541, and a retainer 544, which supports the ball-biasing spring 543.

When the conventional hydraulic tensioner 500 is set at a downward angle in an engine, as shown in FIGS. 6A and 6B, the high pressure chamber R of the hydraulic tensioner 500 becomes filled with oil while the engine is in operation, and proper tension is maintained in timing chain C. For further details of the typical conventional hydraulic tensioner 500, reference may be made to United States Patent Application publication no. 2002/0142871, published Oct. 3, 2002.

When the conventional hydraulic tensioner 500, is set at a downward angle, when the engine is stopped and left standing for a long period of time, oil in the high pressure oil chamber R leaks downward by gravity, through a slight gap between the plunger-accommodating hole 511 of the housing 510 and the outer circumferential surface of the plunger, as shown in FIG. 7. As the oil leaks, outside air A is drawn into the high pressure chamber R through the gap between the plunger and the wall of the plunger-accommodating hole. A reduction in pressure within chamber R can result in an acceleration of oil leakage because, as the pressure decreases, more outside air is drawn into the chamber R, and, as a result, oil can flow out of the chamber by gravity at a faster rate. As shown in FIG. 7, a relatively large portion of the high pressure chamber R can become filled with air A. The compressibility of the air in chamber R prevents the tensioner from exerting an adequate damping force, i.e., the force exerted on the chain by the plunger, the magnitude of which is determined by the rate of leakage of oil through the gap between the outer circumferential surface of plunger and the cylindrical wall of the plunger-accommodating hole. The impairment of the operation of the tensioner due to accumulation of air in the high pressure chamber R is particularly significant upon engine start-up after the engine has been stopped and left standing for a long period of time. When air accumulates in the high pressure oil chamber, backlash of the timing chain C cannot be suppressed and an abnormal sound is generated. Additionally, the timing chain C can be unexpectedly damaged. Another problem with the conventional hydraulic tensioner is that it consumes oil at a relatively high rate, and requires an oil pump having a high output.

Still another troublesome problem with the conventional hydraulic tensioner 500 was that, in manufacture, it was difficult to achieve a proper clearance between the cylindrical wall of the plunger-accommodating hole 511 and the outer circumferential surface of the plunger 520, as the clearance is affected by various factors including size and measurement errors, surface finishing, materials and the like.

Accordingly, an object of this invention is to solve the above-described problems, and to provide a downward angle-settable hydraulic tensioner in which the full hydraulic damping force is achieved upon starting of the engine, so that backlash of the timing chain is suppressed and the generation of abnormal sounds is prevented.

SUMMARY OF THE INVENTION

The hydraulic tensioner in accordance with the invention comprises a housing having a plunger-accommodating hole with a cylindrical inner wall and a bottom end, and a plunger having a cylindrical outer surface. The plunger is slidable in the plunger-accommodating hole and protrudes therefrom to apply tension to a traveling chain. The plunger has a hollow interior portion with a cylindrical inner wall. The hollow interior portion is open toward the bottom end of the plunger-accommodating hole. The plunger-accommodating hole and the hollow interior portion of the plunger together form a high pressure oil chamber. A plunger-biasing spring disposed in the high-pressure oil chamber urges the plunger in a direction to protrude from the housing. An oil supply passage is provided in the housing to supply oil to the high pressure oil chamber. A check valve unit is arranged to block flow of oil from the high pressure oil chamber through the oil supply passage. A hollow sleeve having an open first end is fixed at the bottom end of the plunger-accommodating hole and communicates with the oil supply passage. The sleeve extends into the hollow interior portion of the plunger and has a second end opposite from its first end. The sleeve has a cylindrical outer circumferential surface in sliding contact with the cylindrical inner wall of the plunger, and the check valve unit is fixed to the sleeve adjacent the second end thereof so that the check valve is located inside the hollow interior portion of the plunger.

The tensioner has a first gap formed between the cylindrical inner wall of the plunger and the cylindrical outer circumferential surface of the sleeve, and a second gap formed between the cylindrical inner wall of the plunger-accommodating hole and the cylindrical outer circumferential surface of the plunger. In a preferred embodiment of the invention, the radial dimensions of the first and second gaps are substantially equal.

Preferably, the check valve unit includes a ball seat press-fit into the inner sleeve, the ball seat having an outer circumferential surface and an internal oil path extending from a first end thereof to a second end thereof, a check ball engageable with the second end of the ball seat to close the oil path and movable away from the second end of the ball seat to open the oil path. A ball-biasing spring urges the check ball against said second end of the ball seat, and a bell-shaped retainer restricts movement of the ball.

The bell-shaped retainer preferably comprises a ball-surrounding portion which supports the ball biasing spring and surrounds the check ball while allowing the check ball to move toward and away from the ball seat. The bell-shaped retainer preferably comprises a plurality of retainer leg portions extending as branches from the ball-surrounding portion. The leg portions are press-fit to the outer circumferential surface of the ball seat, and form oil introducing slots between the leg portions through which oil in the high pressure oil chamber is replenished from the oil path of the ball seat when the plunger moves in its protruding direction, and through which oil passes out of the high pressure oil chamber in order to leak to the outside of the housing when the plunger moves opposite to its protruding direction.

If the engine in which the tensioner is incorporated is left standing for a long period of time, oil leaks by gravity through a gap between a plunger-accommodating hole of the housing and the outer circumferential surface of the plunger. As a result of the leakage of oil, air is drawn from the outside into the region surrounding the upper end of the sleeve. However, the air does not enter the high pressure chamber, which is lower than the region surrounding the upper end of the sleeve. Thus, even upon starting of the engine after it has been standing in a stopped condition for a long time, the full damping force of the tensioner is exerted, and backlash of the timing chain and abnormal sounds can be prevented.

Furthermore, since the plunger slides between the inner circumferential wall of the plunger-accommodating hole and the outer circumferential surface of the sleeve, a labyrinth structure is formed, which suppresses excessive leakage of oil.

When the gap between the inside wall of the plunger and the sleeve is substantially equal to the gap between the outside of the plunger and the inside wall of the plunger-accommodating hole in the housing, if a sudden force exerted on the plunger by a timing chain presses the plunger in the retracting direction on starting of the engine, the hydraulic damping force is generated in both gaps and, as a result, a stronger hydraulic damping force is achieved.

Furthermore, since the check valve unit includes a ball seat press-fit into the inner sleeve, a check ball facing the ball seat on the high pressure chamber side of the ball seat, a ball-biasing spring urging the check ball against the ball seat, and a bell-shaped retainer which restricts the movement of said check ball, even if a sudden force exerted on the plunger by a timing chain presses the plunger in the retracting direction on starting of the engine, oil in the high pressure chamber leaks through the clearance between the cylindrical hollow portion of the plunger and the outer circumferential surface of the inner sleeve. Consequently, the sudden pressing force can be absorbed.

Additionally, since the bell-shaped retainer comprises a ball-surrounding portion, which supports the ball biasing spring and surrounds the check ball while allowing free movement of the check ball toward and away from the ball seat, and branched leg portions press-fit to the outer circumferential surface of the ball seat and providing oil introducing slots for replenishment and leakage of oil, when the plunger is pressed back into the plunger-accommodating hole, even though a plunger-biasing spring intervenes between the plunger and the bell-shaped retainer, the oil in the high pressure chamber can leak to the outside of the housing through the gap between the hollow portion of the plunger and the outer circumferential surface of the sleeve after flowing through the oil-introducing slots of the retainer. Thus, a sudden change in tension in the timing chain can be absorbed instantaneously, and an optimum hydraulic balance in the housing can be realized. Likewise, when excessive oil is supplied from an external oil source, it is supplied to the high pressure chamber through the oil-introducing slots. However, even through a plunger-biasing spring intervenes between the plunger and the bell-shaped retainer, a part of the excessive oil leaks outside the housing through a gap between the cylindrical hollow portion of the plunger and the outer circumferential surface of the sleeve after flowing through the oil introducing slots. Thus, excessive supply of oil to the high pressure chamber is suppressed and an optimum hydraulic balance in the housing can be further realized.

DETAILED DESCRIPTION OF THE PREFERRED EMBODIMENT

The tensioner according to the invention comprises a plunger, which protrudes slidably from a plunger-accommodating hole in a tensioner housing in a direction to apply tension to a traveling chain. The plunger has a cylindrical hollow portion which communicates with the plunger-accommodating hole of the housing. An inner sleeve fixed at the bottom end of the plunger-accommodating hole has an open end communicating with an oil supply passage in the housing, and extends slidably into the cylindrical hollow portion of the plunger. A check valve unit is fixed at the opposite end of the of the inner sleeve so that it protrudes into a high pressure chamber formed in the cylindrical hollow portion of the plunger. The check valve unit allows flow of oil into the high pressure chamber, but blocks reverse flow of oil from the chamber toward the oil supply passage. A plunger-biasing spring, which expands and contracts, is accommodated in the high pressure chamber. Even if the hydraulic tensioner is set at a downward angle in an engine, a hydraulic damping force is exhibited by the plunger upon starting of the engine so that backlash of the timing chain is suppressed, and abnormal sounds are not generated. Optionally, the hydraulic tensioner of the invention can be provided with a rack on its plunger and a ratchet pawl pivoted on the housing to limit retracting movement of the plunger.

The tensioner of the invention is typically mounted at a downward angle so that the plunger moves obliquely downward as it moves in the protruding direction from the tensioner housing. However, the tensioner can be set horizontally, or mounted so that the plunger moves obliquely upward as it protrudes.

Figure 1A:
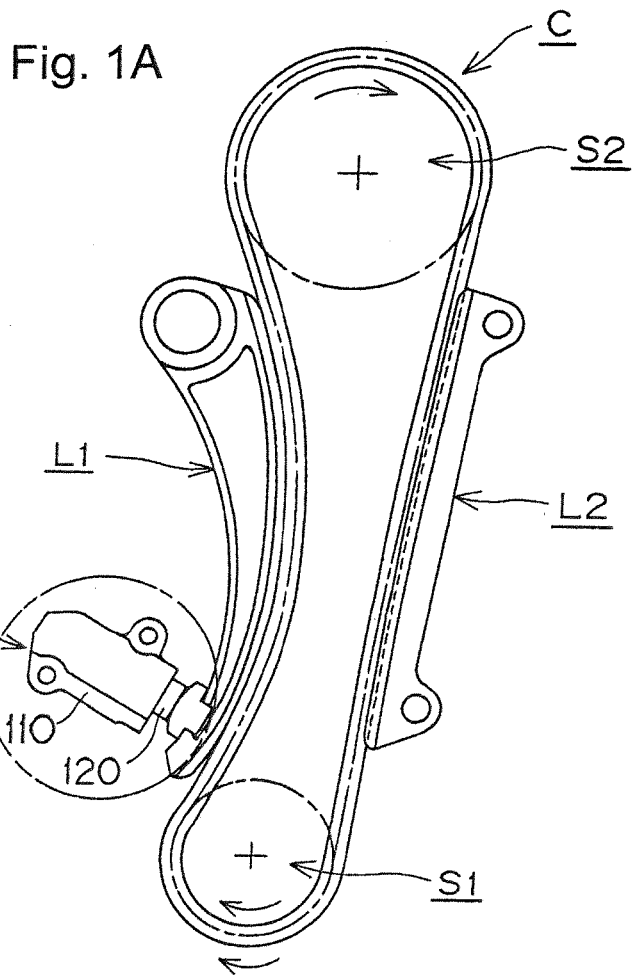
FIG. 1A is a schematic elevational view showing a downward angle settable hydraulic tensioner according to the invention incorporated into the valve timing transmission of an internal combustion engine.
Figure 1B:
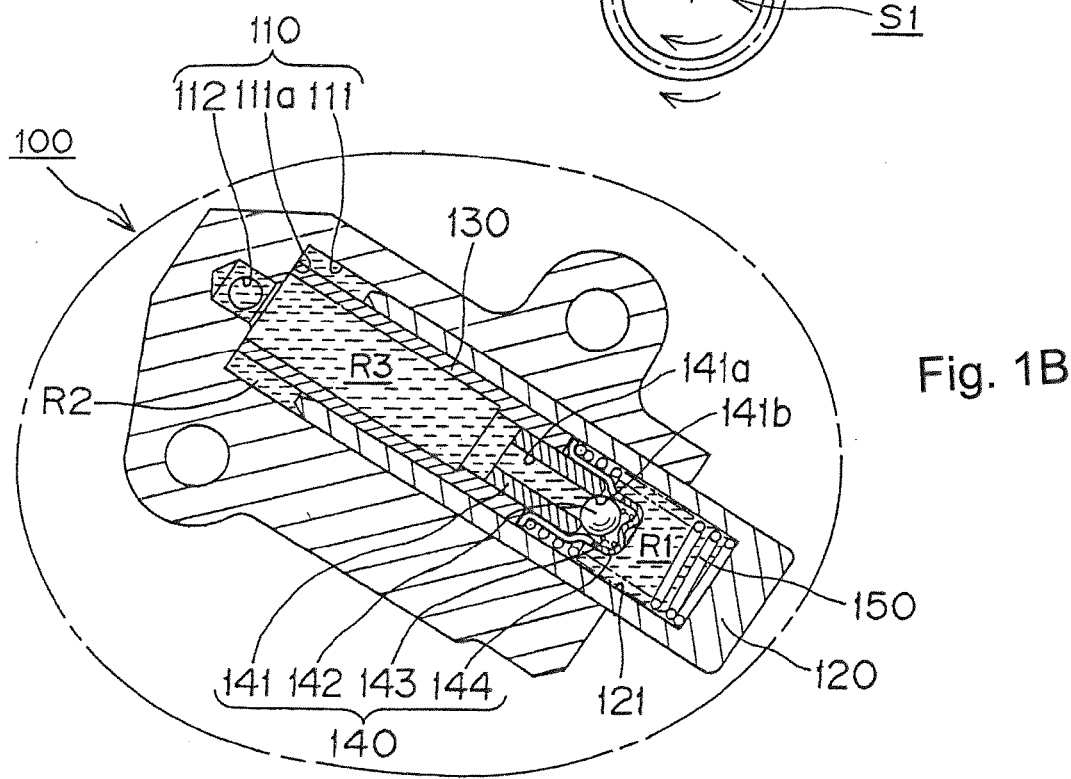
FIG. 1B is an enlarged auxiliary view of the tensioner.
Figure 2:
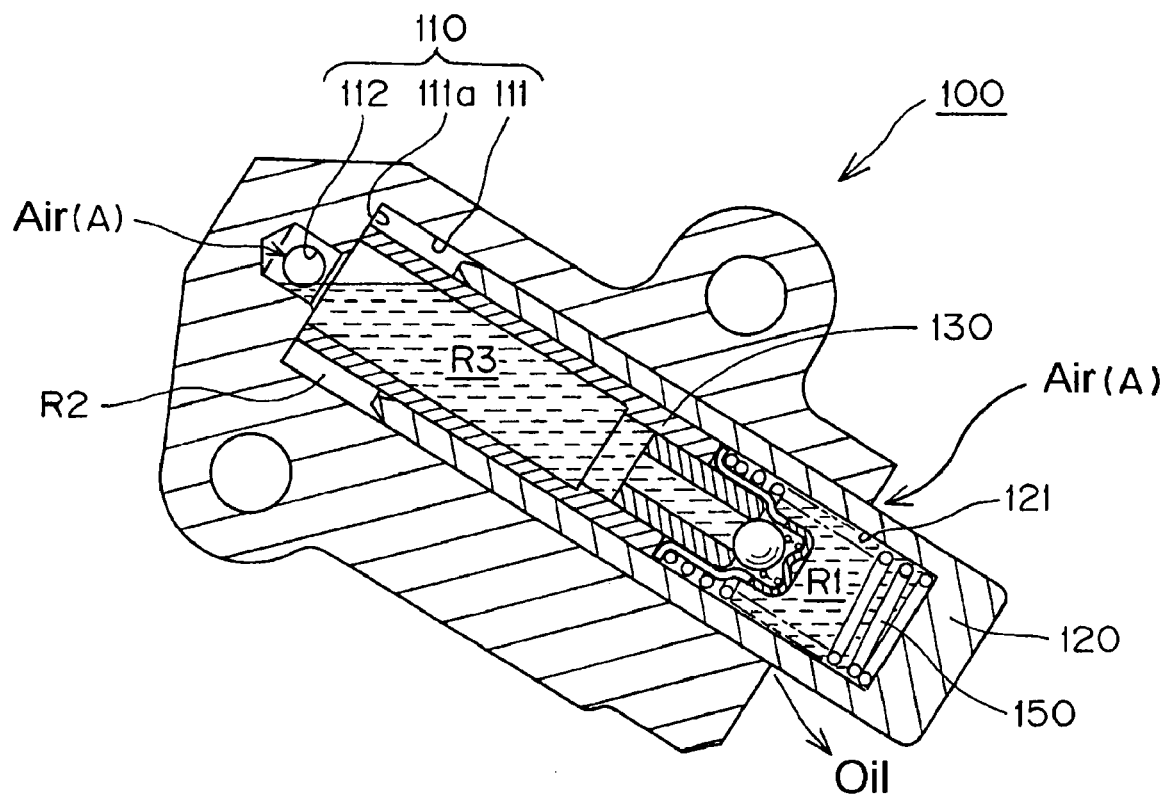
FIG. 2 is a longitudinal cross-sectional view of the tensioner, showing air accumulated in the tensioner when the engine is stopped.

As shown in FIGS. 1A, 1B, and 2, the downward angle settable hydraulic tensioner 100 is mounted on an engine adjacent the slack side of a timing chain C that transmits rotation from a crankshaft sprocket S1 to a camshaft sprocket S2. A cylindrical plunger 120 of the tensioner 100 protrudes extendably and retractably from a tensioner housing 110, and engages the back of a pivoted lever L1 at a location remote from the lever's pivot axis to apply tension to the slack side of the timing chain C through the lever L1. The tension side of the timing chain C slides on a fixed guide L2. The directions of rotation of the sprockets S1 and S2 and the timing chain C are indicated by arrows.

As shown in FIG. 1B, plunger 120 fits slidably in a plunger accommodating hole 111 in housing 110. The plunger has a cylindrical hollow interior 121, and its outer end is closed whereas its inner end is open.

An inner sleeve 130, which communicates with an oil supply passage 112, is open at the bottom 111a of the plunger-accommodating hole 111, and protrudes into the cylindrical hollow interior 121 of the plunger 120, with the outer surface of the sleeve in sliding contact with the inner surface of the plunger. The sleeve is fixed to the housing at the bottom 111a of the plunger-accommodating hole 111. An oil reservoir R3, communicating with the oil supply passage 112, is formed inside sleeve 130.

A check valve unit 140 fixed to the end of the inner sleeve 130 remote from the bottom of the plunger-accommodating hole, protrudes into a high pressure chamber R1 formed within in the cylindrical hollow interior 121 of the plunger 120. The check valve unit 140 comprises a ball seat 141 having an oil path 141a. The ball seat is press-fit into the inner sleeve 130. The check valve unit also includes a check ball 142 which faces a valve seating surface 141b on the high pressure chamber side of the ball seat 141. A ball-biasing spring 143 urges the check ball 142 against the valve seating surface 141b of the ball seat 141, and a bell-shaped retainer 144 restricts movement of the check ball 142 toward and away from the seating surface 141b. The check valve unit receives oil from the oil supply passage 112 through the sleeve 130.

A plunger-biasing spring 150, which expands and contracts, and which urges the plunger 120 in a direction to protrude from plunger-accommodating hole 111, is provided in the high pressure chamber R1.

In the downward angle settable hydraulic tensioner 100 according to the invention, when an impact force acts on the protruding front end of the plunger 120, through lever L1, as a result of a change in tension in the timing chain C, the plunger 120 is rapidly pushed in the retracting direction against the biasing force of the plunger-biasing spring 150. The pressure of the oil in the high pressure chamber R1 is increased, and the check ball 142 is pushed against the ball seat 141 so that reverse flow of the oil from the high pressure chamber R1 through the oil path 141a is blocked.

The region R2, shown in FIG. 2, is the region formed by the housing 110, the plunger 120, and the inner sleeve 130. When the engine is stopped and left standing for a long period of time with the tensioner set at a downward angle, even if the oil in region R2 leaks downward by gravity through the gap between the plunger-accommodating hole 111 and the outer circumferential surface of the plunger 120 so that air A is drawn into the region R2, the air does not enter the high pressure chamber R1, which is positioned lower than the region R2. Thus, the full oil pressure damping force is exhibited, and backlash of the timing chain C, which is liable to occur on starting of the engine, is prevented so that generation of abnormal sound is avoided.

Furthermore, since the plunger 120 slides between the inner circumferential wall of the plunger-accommodating hole 111 and the outer circumferential surface of the sleeve 130, a labyrinth structure is formed. The labyrinth structure is composed of a first gap, formed between the outer circumferential surface of the sleeve 130 and the inner circumferential wall of plunger 120, and a second gap, formed between the outer circumferential surface of the plunger 120 and the inner circumferential surface of the plunger-accommodating hole 111. Because of these two gaps, the consumption of oil resulting from leakage of oil to the outside of the tensioner is significantly suppressed, and the oil is maintained in the tensioner for a long period of time.

If the first gap, between the internal wall of the plunger 120 and the outer surface of the sleeve 130 is substantially equal to the second gap, between the plunger-accommodating hole 111 and the outer circumferential surface of the plunger 120, when a sudden force exerted by the timing chain presses the plunger 120 inward upon starting of the engine, a hydraulic damping force is generated in the region R2. The hydraulic damping force generated in region R2 acts together with the hydraulic damping force generated in chamber R1 so that a stronger hydraulic damping force acts on the plunger 120.

When a sudden pressing force exerted by the timing chain C acts on the plunger 120 on starting of the engine, oil in the high pressure chamber R1 leaks into the region R2 through a slight clearance between the cylindrical hollow interior wall 121 of the plunger 120 and the outer circumferential surface of the sleeve 130. Thus, the sudden pressing force exerted by the timing chain C can be absorbed.

Figure 3:
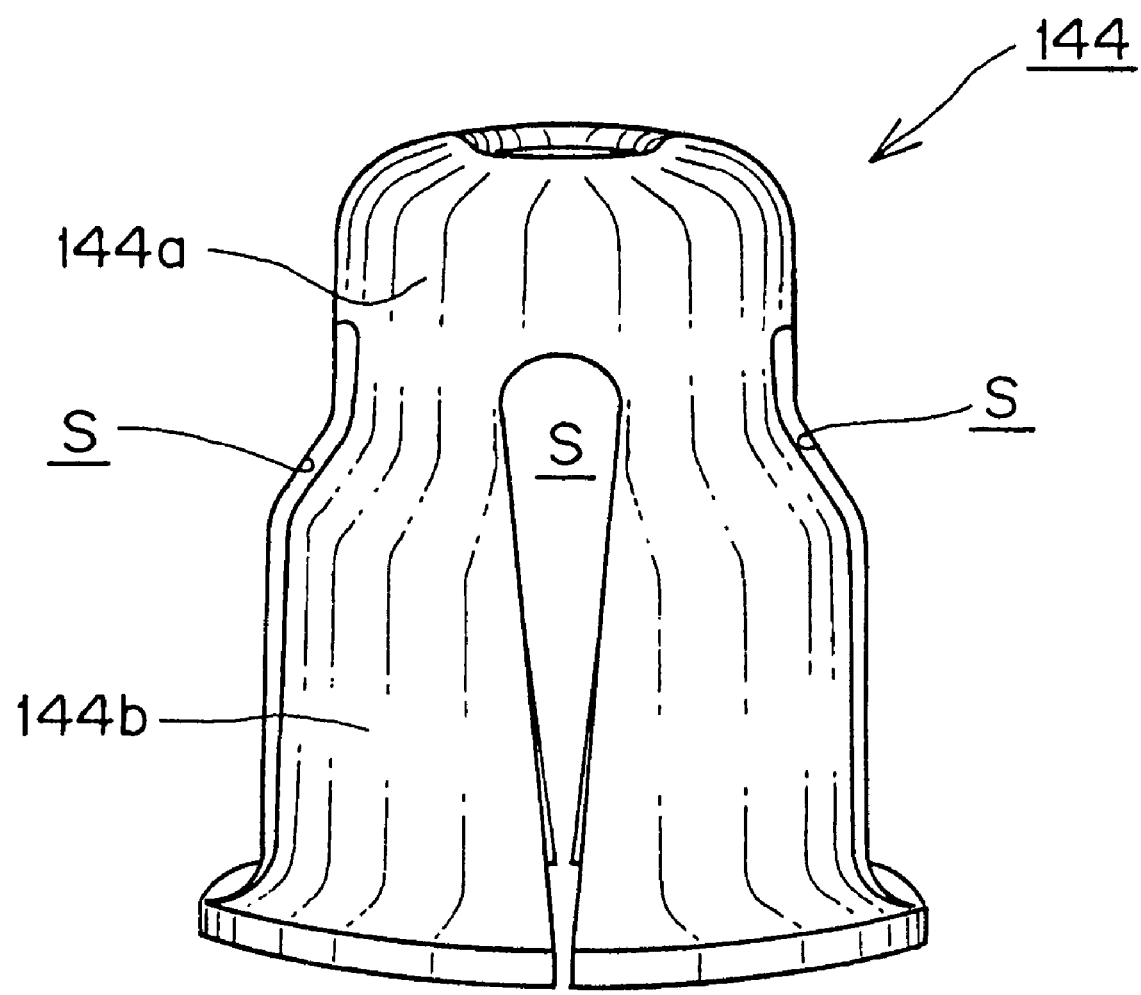
FIG. 3 is an enlarged perspective view of a bell-shaped retainer used in the tensioner.
Figure 4:
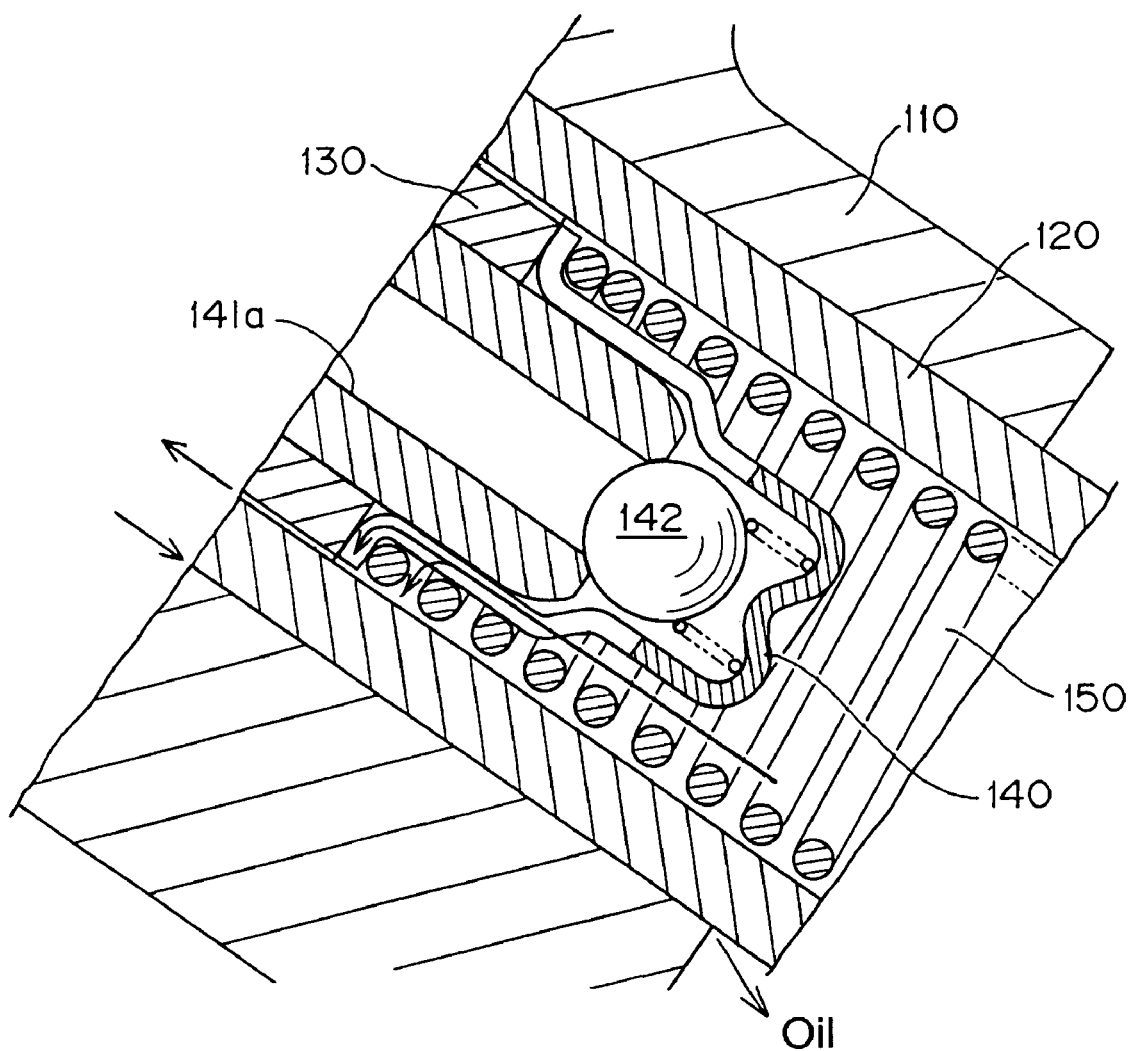
FIG. 4 is an enlarged sectional view showing oil flow in the tensioner when the check ball of the tensioner is seated on its ball seat.

The bell-shaped retainer 144 of the check valve unit 140 shown in FIG. 3 comprises a ball-surrounding portion 144a, which supports the ball-biasing spring 143 and surrounds the check ball while permitting free movement of the check ball 142 within a limited range. The bell-shaped retainer has four leg portions 144b, which are in the form of branches, extending from the ball-surrounding portion 144a. These leg portions are press-fit onto the outer circumferential surface of the ball seat 141. Oil-introducing slots S are Formed between the leg portions. Through these slots S, oil from the oil path 141a is replenished to the high pressure chamber R1. As shown in FIG. 4, when tension in the timing chain presses the plunger into the plunger-accommodating hole 111, even though the plunger-biasing spring 150 intervenes between the plunger 120 and the bell-shaped retainer 144, the oil in the high pressure chamber R1 can flow to the outside of the housing through the gap between the cylindrical hollow interior 121 of the plunger 120 and the outer circumferential surface of the inner sleeve 130 after the oil flows through the oil-introducing slots S of the retainer 144. Thus, a sudden change in tension in the timing chain C is instantaneously absorbed so that an optimum hydraulic balance in the housing 110 can be realized.

Figure 5:
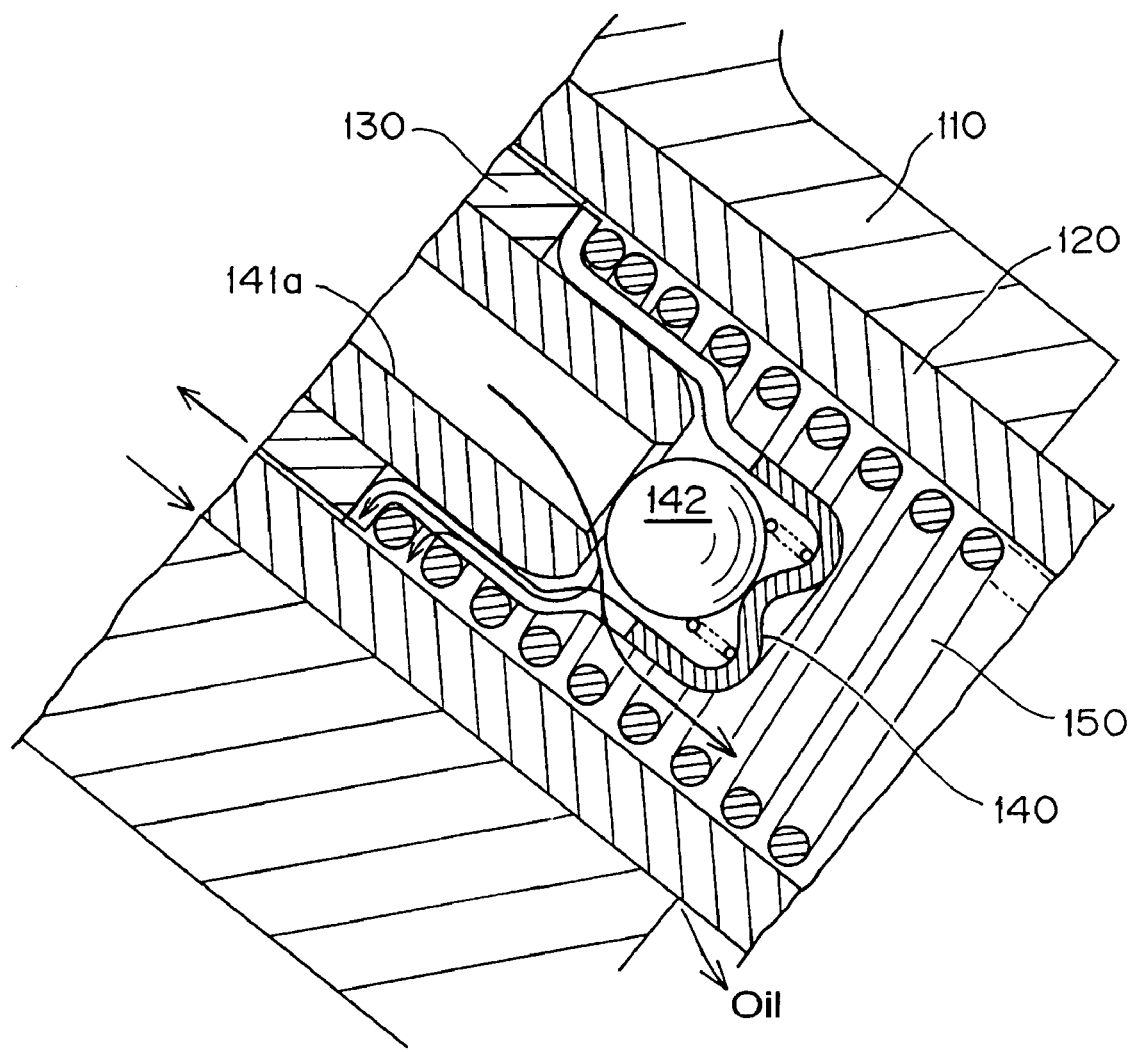
FIG. 5 is an enlarged sectional view showing oil flow in the tensioner when the check ball of the tensioner is separated from its ball seat.
Figure 6A:
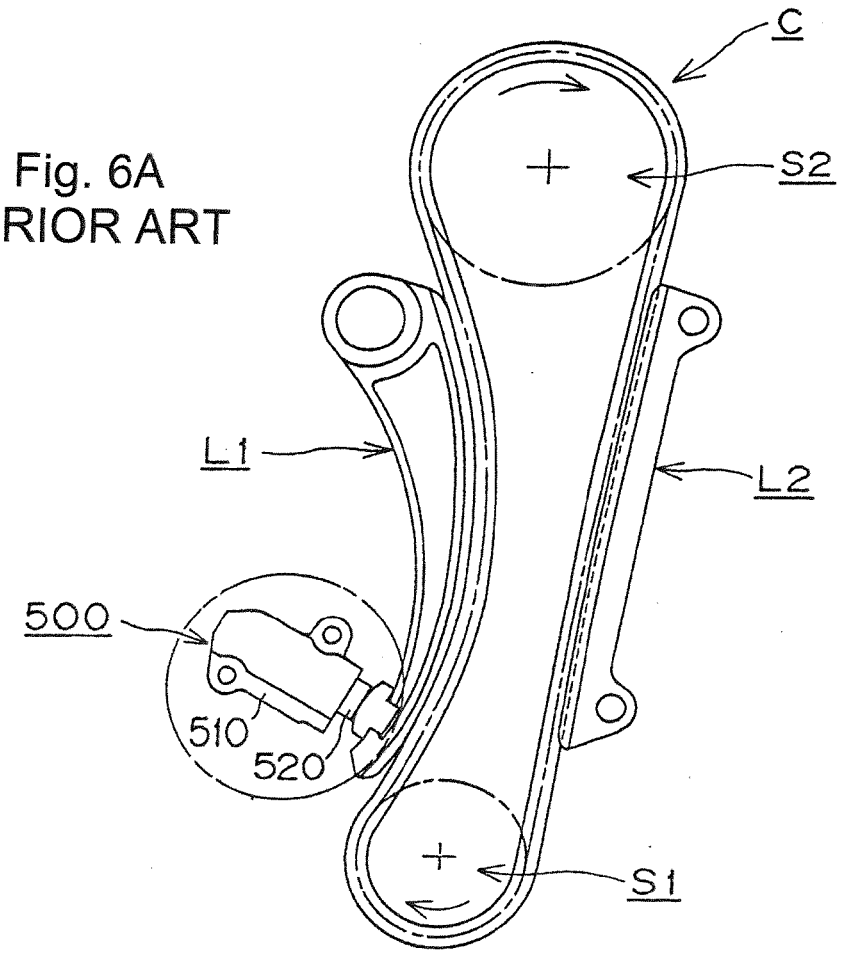
FIG. 6A is a schematic elevational view showing a conventional downward angle settable hydraulic tensioner incorporated into the valve timing transmission of an internal combustion engine.
Figure 6B:
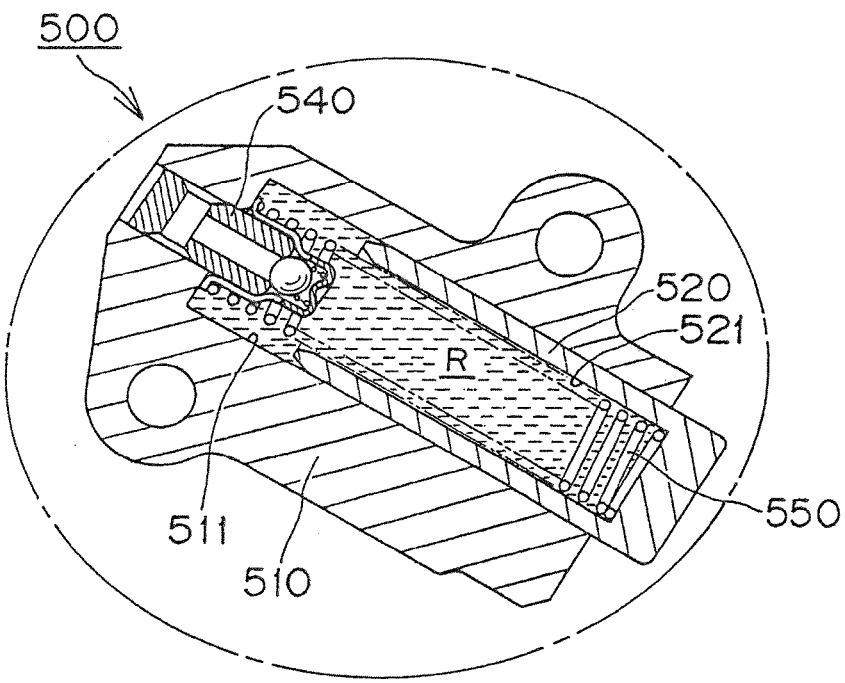
FIG. 6B is an enlarged auxiliary view of the conventional tensioner.
Figure 7:
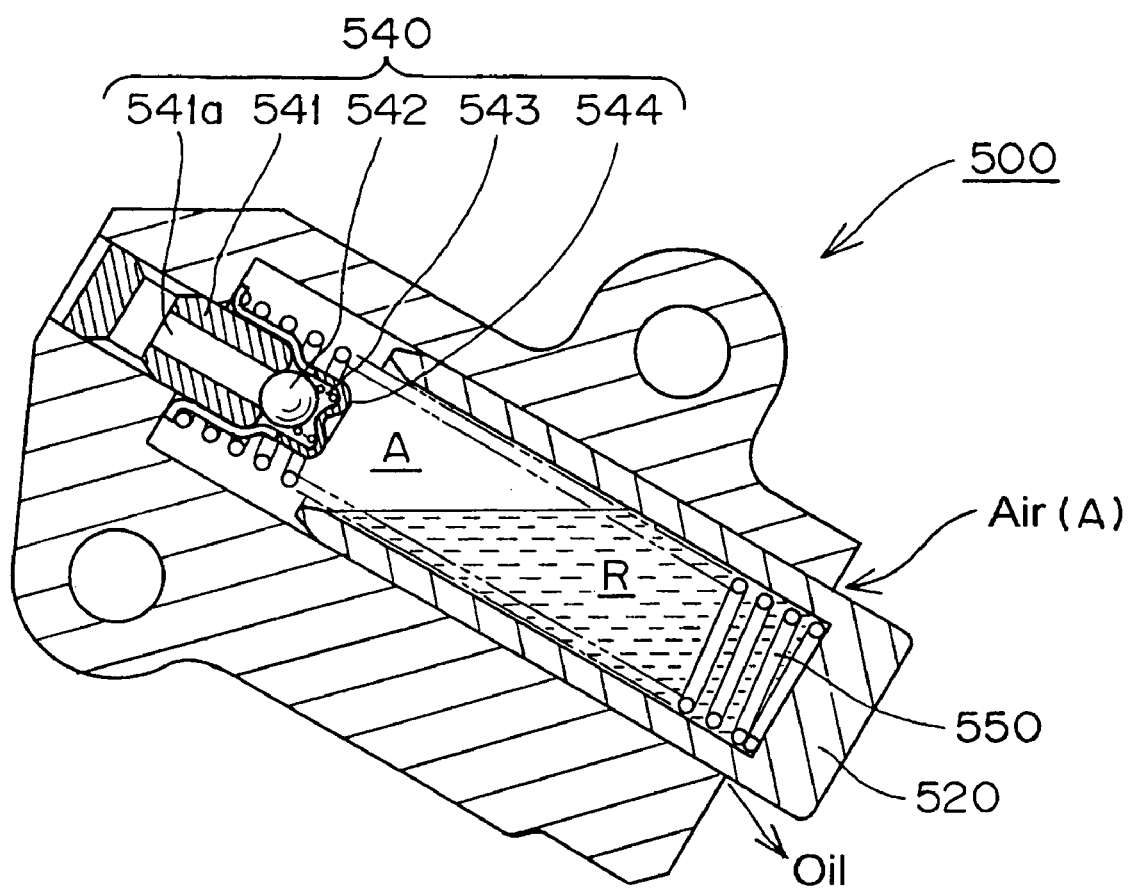
FIG. 7 is a longitudinal cross-sectional view of the conventional tensioner, showing air accumulated in the tensioner when the engine is stopped.

As shown in FIG. 5, if excessive oil is supplied from an external oil supply through the ball seat 141, the oil is supplied to the high pressure chamber R1 through the four oil introducing slots S. However, even though the plunger-biasing spring 150 intervenes in the gap between the plunger 120 and the retainer 144, some of the oil leaks to the outside of the housing through the gap between the cylindrical hollow interior 121 of the plunger 120 and the outer circumferential surface of the inner sleeve 130 after the oil in the high pressure chamber R1 flows through oil-introducing slots S between the retainer legs 144b. Thus the excessive supply of oil to the high pressure chamber R1 is suppressed so that an optimum hydraulic balance in the housing 110 can be further realized.

The particular bell-shaped retainer 144, as shown in FIG. 3, has four retainer leg portions 144b, and oil introducing slots S are formed between the retainer leg portions 144b. However, the number of legs and slots can be varied. For example, in an alternative embodiment of the retainer, two retainer legs and two slots can be provided.

In the hydraulic tensioner 100 of the invention, horizontal setting and upward angle setting in a vehicle engine are possible. However, if the tensioner is arranged so that its plunger protrudes in an oblique downward direction, the maximum hydraulic damping force is exhibited at the time of engine start-up, so that backlash of a timing chain C is suppressed, and the generation of abnormal sounds can be prevented.

The invention claimed is:

1. A downward angle settable hydraulic tensioner comprising;
   a housing having a plunger-accommodating hole surrounded by a circular cylindrical inner wall of the housing, a front end having an opening, and a bottom end;
   a plunger having a circular cylindrical outer surface extending completely around the plunger, and front and back ends, the plunger being slidable in said plunger-accommodating hole and protruding from the front end of the plunger-accommodating hole for applying tension to a traveling chain, said plunger having a hollow interior portion with a circular cylindrical inner wall surrounding said hollow interior portion, said hollow interior portion being open toward the bottom end of the plunger-accommodating hole, and the plunger-accommodating hole and the hollow interior portion of the plunger together forming a high pressure oil chamber;
   a plunger-biasing spring disposed in said high pressure oil chamber and urging the plunger in a direction to protrude from the housing;
   an oil supply passage for supplying oil to the high pressure oil chamber;
   a check valve unit arranged to block flow of oil from the high pressure oil chamber through the oil supply passage; and
   a hollow sleeve having an open back end fixed at the bottom end of the plunger-accommodating hole and communicating with said oil supply passage, said sleeve extending into the hollow interior portion of the plunger and having a front end opposite from said back end, the sleeve having a circular cylindrical outer circumferential surface extending completely around the sleeve and in sliding relationship with said circular cylindrical inner wall of the plunger; and
   said check valve unit being fixed to said sleeve adjacent said front end thereof whereby the check valve is located inside the hollow interior portion of the plunger;
   wherein the tensioner has a first gap, having a substantially uniform width, formed between the circular cylindrical inner wall of said plunger and the circular cylindrical outer circumferential surface of said sleeve, the first gap surrounding the sleeve and extending substantially from the front end of the sleeve to the back end of the plunger, and a second gap, also having a substantially uniform width, formed between the cylindrical inner wall of the plunger-accommodating hole and the cylindrical outer circumferential surface of said plunger, the second gap surrounding the plunger and extending substantially from the back end of the plunger to the front end of the plunger-accommodating hole, and the widths of said first and second gaps being substantially equal;
   wherein the parts of the cylindrical inner wall of the plunger and the cylindrical outer circumferential surface of said sleeve between which said first gap is formed both have uniform diameters throughout the length of said first gap over a range of extended and retracted positions of the plunger including a position in which the plunger is fully retracted into said plunger-accommodating hole; and
   wherein the parts of the cylindrical inner wall of the plunger-accommodating hole and the cylindrical outer circumferential surface of said plunger between which said second gap is formed also have uniform diameters throughout the length of said second gap over said range of extended and retracted positions of the plunger.

2. A downward angle settable hydraulic tensioner according to claim 1, in which said check valve unit includes a ball seat press-fit into said inner sleeve, the ball seat having an outer circumferential surface and an internal oil path extending from a first end thereof to a second end thereof, a check ball engageable with said second end of the ball seat to close said oil path and movable away from said second end of the ball seat to open said oil path, a ball-biasing spring urging said check ball against said second end of the ball seat, and a bell-shaped retainer restricting movement of said check ball.

3. A downward angle settable hydraulic tensioner according to claim 2, in which the bell-shaped retainer comprises a ball-surrounding portion, which supports said ball biasing spring and surrounds the check ball while allowing the check ball to move toward and away from the ball seat, and a plurality of retainer leg portions extending as branches from the ball-surrounding portion, said leg portions being press-fit to the outer circumferential surface of the ball seat, and forming oil introducing slots between said leg portions, through which oil in the high pressure oil chamber is replenished from said oil path of the ball seat when the plunger moves in its protruding direction, and through which oil passes out of the high pressure oil chamber in order to leak to the outside of said housing when the plunger moves opposite to its protruding direction.

4. A downward angle settable hydraulic tensioner according to claim 3, wherein the tensioner is positioned so that its plunger protrudes from the front end of the plunger-accommodating hole in an oblique downward direction.

5. A downward angle settable hydraulic tensioner according to claim 2, wherein the tensioner is positioned so that its plunger protrudes from the front end of the plunger-accommodating hole in an oblique downward direction.

6. A downward angle settable hydraulic tensioner according to claim 1, wherein the tensioner is positioned so that its plunger protrudes from the front end of the plunger-accommodating hole in an oblique downward direction.

* * * * *